United States Patent
Burts, Jr. et al.

(10) Patent No.: US 7,748,455 B2
(45) Date of Patent: Jul. 6, 2010

(54) SURFACED MIXED EPOXY METHOD FOR PRIMARY CEMENTING OF A WELL

(76) Inventors: Boyce D Burts, Jr., 101 Ravens Wood, Lafayette, LA (US) 70508; Boyce Donald Burts, III, 200 Southern Pines, Lafayette, LA (US) 70508; Freddie L. Sabins, 7007 Racquet Ct., Houston, TX (US) 77069; Larry Watters, 1006 Windsor Chase La., Spring, TX (US) 77373

( * ) Notice: Subject to any disclaimer, the term of this patent is extended or adjusted under 35 U.S.C. 154(b) by 0 days.

(21) Appl. No.: 11/948,925

(22) Filed: Nov. 30, 2007

(65) Prior Publication Data

US 2008/0264638 A1 Oct. 30, 2008

Related U.S. Application Data

(63) Continuation of application No. 11/162,452, filed on Sep. 9, 2005, now abandoned.

(60) Provisional application No. 60/608,255, filed on Sep. 9, 2004, provisional application No. 60/608,256, filed on Sep. 9, 2004, provisional application No. 60/608,257, filed on Sep. 9, 2004.

(51) Int. Cl.
*E21B 33/14* (2006.01)
*C09K 8/44* (2006.01)
(52) U.S. Cl. ........................................ 166/295; 166/300
(58) Field of Classification Search ....................... None
See application file for complete search history.

(56) References Cited

U.S. PATENT DOCUMENTS 6,098,711 A * 8/2000 Chatterji et al. ............. 166/294
6,234,251 B1 * 5/2001 Chatterji et al. ............. 166/295

OTHER PUBLICATIONS

Physical Properties Guide © 2001 Resolution Performance Products.*

* cited by examiner

*Primary Examiner*—Zakiya W. Bates
(74) *Attorney, Agent, or Firm*—Gilbreth & Roebuck, P.C.; J. M. Gilbreth; Mary A. Gilbreth

(57) ABSTRACT

A two part epoxy resin system is surface mixed in a method of primary cementing a well. This surface mixed epoxy resin is then placed in the annulus of the well. Finally, the mixture in situ forms a hard impermeable mass.

6 Claims, No Drawings

US 7,748,455 B2

SURFACED MIXED EPOXY METHOD FOR PRIMARY CEMENTING OF A WELL

This application is a continuation of U.S. patent application Ser. No. 11/162,452, filed Sep. 9, 2005, now abandoned herein incorporated by reference, which claimed priority/benefit of U.S. Provisional Patent Application Ser. Nos. 60/608,255, 60/608,256, and 60/608,257, all filed Sep. 9, 2004, and all herein incorporated by reference.

BACKGROUND OF THE INVENTION

1. Field of the Invention

The present invention relates to wells, drilling wells, well operations, to methods, apparatus and products for drilling wells. In another aspect, the present invention relates to wells, cementing wells, and to methods, apparatus and products for cementing wells. In even another aspect, the present invention relates to wells, primary cementing wells, and to methods, apparatus and products for primary cementing wells.

2. Brief Description of the Related Art

In the drilling and completion of an oil or gas well, a cementing composition is often introduced in the well bore for cementing pipe string or casing in a process known as primary cementing. In primary cementing, a cementing composition is pumped into the annular space between the walls of the well bore and the casing. The cementing composition sets in the annular space, supporting and positioning the casing, and forming a substantially impermeable barrier/mass or cement sheath. An essential function of cementing is to prevent fluid exchange between the different formation layers through which the hole passes and to control the ingress of fluid into the well, in particular to limit the ingress of water. In production zones, the casing, the cement and the formation are all perforated over a depth of a few centimeters.

A variety of cementing compositions exist in the art and have been used for primary cementing. Considerations for selecting a cementing composition include relatively short term concerns, such as set times for the cement slurry, as well as functional and long term concerns such as whether a composition is environmentally acceptable, easily mixable, non-settling under static and dynamic conditions, will develop near one hundred percent placement in the annular space, resist fluid influx, and have the desired density, thickening time, set up time, fluid loss, strength development, and zero free water.

A number of patents and patent applications are directed to primary cementing wells, the following of which are only a small few.

U.S. Pat. No. 4,768,593, issued Sep. 6, 1988, to Novak discloses This application discloses a process for drilling and primary cementing a well using a drilling fluid containing a polymeric material which may be cemented into a well cement by irradiation with a suitable radioactive source U.S. Pat. No. 5,151,203, issued Sep. 29, 1992, to Riley et al., discloses a composition for and method of performing primary cementing operations. The method comprises the use of a water slurry of a thixotropic cementing composition which rapidly develops sufficient static gel strength to reduce if not eliminate annular gas migration.

U.S. Pat. No. 5,327,969, issued Jul. 12, 1994, to Sabins et al., discloses a method of preventing gas migration during primary well cementing. The method basically comprises the steps of displacing a cement slurry into the annulus between a string of pipe to be cemented in a well bore and the walls of the well bore, determining the initial surface pressure in the pipe after the cement slurry is placed in the annulus, displacing additional cement slurry into the annulus as is necessary to make up for losses in the surface pressure due to cement slurry gel strength development and volume reduction whereby the surface pressure is maintained substantially equal to the initial surface pressure until the cement slurry develops a predetermined gel strength sufficient by itself to prevent gas migration, and then allowing the cement slurry to set into a hard impermeable mass in the annulus.

U.S. Pat. No. 5,343,950, issued Sep. 6, 1994 to Hale et al., discloses An extended reach well such as the deviated wells typically drilled from offshore platforms is drilled using a drilling fluid comprising blast furnace slag and water which drilling fluid is circulated during the drilling to lay down a filter cake. Thereafter, an activator is added and generally, an alkaline material and additional blast furnace slag, to produce a cementitious slurry which is passed down a casing and up into an annulus to effect primary cementing.

U.S. Pat. No. 5,343,951, issued Sep. 6, 1994 to Cowan et al., discloses a slim hole well drilled using a drilling fluid comprising blast furnace slag and water which drilling fluid is circulated during the drilling to lay down a filter cake. Thereafter, an activator is added and generally, an alkaline material and additional blast furnace slag, to produce a cementitious slurry which is passed down a casing and up into an annulus to effect primary cementing.

U.S. Pat. No. 5,370,185, issued Dec. 6, 1994 to Cowan et al., a cementitious slurry produced by combining an aqueous drilling fluid with a slurry of Portland cement in oil. Generally the drilling fluid is an aqueous drilling fluid containing clay such as prehydrated bentonite. The resulting composition has a particular utility in primary cementing operations for oil wells.

U.S. Pat. No. 5,829,523, issued Nov. 3, 1998 to Sabins et al., discloses primary well cementing methods and apparatus. The methods basically comprise the steps of releasing a displacement plug into the casing to be cemented and pumping a first displacement fluid behind the displacement plug while measuring the quantity of the first displacement fluid required to land the displacement plug on a float collar or the like connected near the bottom of the casing, releasing a bottom cementing plug into the casing and pumping a cement slurry behind the bottom cementing plug in a predetermined quantity and then releasing a top cementing plug into the casing and pumping a second displacement fluid behind the top cementing plug in a quantity substantially equal to the measured quantity of the first displacement fluid thereby ensuring that the cement slurry is not under or over displaced in the annulus between the casing and the well bore.

U.S. Pat. No. 6,065,539, issued May 23, 2000 to Noik et al., discloses a method of cementing a casing in a well drilled in the ground comprises injecting a liquid material comprising phenol-formol resin from the surface, wherein the resin is modified by means of a determined amount of furfuryl alcohol, and an amount of mineral filler unreactive towards the resin is added. The invention further relates to a thermosetting cementing material comprising phenol-formol resin. The resin is modified by means of an amount of furfuryl alcohol and comprises at least a proportion of an unreactive granular filler.

U.S. Pat. No. 6,626,991, issued Sep. 30, 2003 to Drochon et al., discloses a cement slurry for cementing an oil well or the like, the slurry having a density lying in the range 0.9 g/cm.sup.3 to 1.3 g/cm.sup.3, and being constituted by a solid fraction and a liquid fraction, having porosity (volume ratio of liquid fraction over solid fraction) lying in the range 38% to 50%. The solid fraction is constituted by a mixture of lightweight particles, microcement and optionally portland cement and gypsum. Such cements have remarkable mechanical properties due to their very low porosity in spite of having very low density.

U.S. Pat. No. 6,776,237, issued Aug. 17, 2004 to Dao et al., discloses lightweight cement compositions and methods of cementing a subterranean zone penetrated by a well bore utilizing the compositions are provided. A lightweight cement composition of the invention is basically comprised of a coarse particulate hydraulic cement, an ultrafine particulate hydraulic cement mixture comprised of slag cement and a Portland or equivalent cement, fly ash, fumed silica, hollow glass spheres and water.

U.S. Pat. No. 6,793,730, issued Sep. 21, 2004 to Reddy et al., discloses methods for cementing. The methods are basically comprised of the steps of preparing a cement composition comprised of hydraulic cement, water, gas, surfactants, a cement early strength accelerator and a mildly set retarding cement dispersing agent, placing the cement composition in the annulus between the casing string and the well bore and allowing the cement composition to set into a hard impermeable mass. The cement composition used can alternatively comprise hydraulic cement, a water reducing additive, a dispersing additive, a set accelerating additive and water. Also, the cement composition can be made environmentally benign by using water reducing and dispersing additives, set retarding additives, and compressive strength and set accelerating additives which are environmentally degradable.

U.S. Pat. No. 6,892,814, issued May 17, 2005, to Heathman et al., discloses cement comprising barite, a process for preparing such cement, and methods of cementing in a subterranean formation or well bore using such cement are provided. The cement is prepared by introducing coarse barite to the cement, the course barite comprising particles having a particle size primarily greater than about 125 microns. Preferably, 90 percent of the barite particles is greater than about 125 microns in size. The presence of the coarse barite in the cement causes the cement to have a relatively low viscosity. Introducing the barite to the cement also increases the density of the cement, thus rendering the cement capable of controlling high hydrostatic pressures in a well bore.

In spite of the advances in the prior art, conventional cement systems suffer from a 6 hour safety margin to dump the slurry; long set times; low shear bond values; long cement lengths, and long wait on cement (WOC) times causing high expense.

Thus, there still exists a need in the art for improved methods, apparatus and products for cementing wells.

There also exists a need in the art for improved methods, apparatus and products for primary cementing operations of wells.

SUMMARY OF THE INVENTION

According to one embodiment of the present invention, there is provided a well comprising a well bore and a pipe residing in said well bore forming an annulus between the pipe and well bore; and a hard impermeable mass in said annulus comprising a polymeric composition, preferably an epoxy composition.

According to even another embodiment of the present invention, there is provided a method of conducting primary cementing operations on a well, said well comprising a well bore and a pipe residing in said well bore forming an annulus between the pipe and well bore. The method includes providing a two component polymeric primary cementing system, preferably an epoxy system, surface mixing the two component system, and then placing the mixed system in the annulus of the well.

According to still another embodiment of the present invention, there is provided a method of primary cementing a well comprising a well bore and a pipe residing in said well bore forming an annulus between the pipe and well bore. The method includes providing a two component polymeric primary cementing system, preferably an epoxy system, surface mixing the two component system, and then placing the mixed system in the annulus, and finally allowing the formation of a hard impermeable mass to fill the annulus.

DETAILED DESCRIPTION OF THE INVENTION

In the practice of present invention, the cementing composition of the present invention may be utilized in any known cementing method including any of the primary cementing methods disclosed in any of the references cited herein, all of which are herein incorporated by reference. Any known method for placing and/or positioning components of a cementing composition into an annulus may be used herein, all of which are herein incorporated by reference.

As used herein, a well generally refers to an underground, substantially vertically-extending well comprising a well bore. Generally, after a well bore is drilled during which the drilling fluid used is circulated through the well bore, the circulation of the drilling fluid is stopped, the well is usually logged and a string of pipe often called a casing, is run in the well bore. Generally the casing extends from the ground surface into the well bore and terminates at a predetermined depth in the well bore. The outer wall of the casing is generally spaced from the inner wall of the well bore to form an annulus. After the casing is set, the drilling fluid in the well bore is conditioned by circulating drilling fluid downwardly through the interior of the pipe and upwardly through the annulus between the exterior of the pipe and the walls of the well bore while removing drilling solids and gas therefrom. After conditioning, both the pipe and annulus are substantially filled with drilling fluid.

The next operation performed on the well is generally the step of primary cementing. By the process of primary cementing a hard impermeable barrier mass is formed in the annulus. This mass may also be referred to as a sheath or cement sheath. Primary cementing is carried out for a number of reasons including to prevent migration of fluids in the annulus, to support the casing or liner string, and to protect of the casing from corrosive formation fluids. Any of the number of methods known in the art for placing a cementing composition into an annulus may be used for the primary cementing compositions and methods of the present invention.

In general primary cementing is carried out as follows. Generally in primary cementing processes the components of a cementing composition are introduced from a source at the ground surface into the upper end of the casing and flow downwardly through the bottom end of the casing. The components of the cementing composition then flow to the bottom of the well bore where their flow direction is reversed causing them to flow up the annulus, thereby placing the components of the cementing composition in the annulus between the pipe and the walls of the well bore. In the primary cementing processes of the present invention, the components of the cementing composition may be placed into the annulus by any of the number of methods known in the art. The flow and addition of the components of the cementing composition is then terminated and the cementing composition is allowed to set into a hard impermeable mass.

The method of the present invention for primary cementing a well involves the use of a two part primary cementing composition, which is incorporated into known primary cementing methods.

In particular, the two part primary cementing composition of the present invention comprises a two polymeric cementing system comprising a polymeric component and an activator component. The polymeric component will in the presence of an activator component be set up, reacted, hardened, cured, catalyzed or crosslinked into a hard impermeable mass.

The polymeric component utilized in the present invention may be any material suitable polymeric material for forming a cementing plug that will adequately plug that abandoned well. Examples of suitable polymeric systems include that described in the references cited herein, all references of which are herein incorporated by reference. This polymeric component may comprise a thermoplastic or thermoset, that is water soluble or insoluable Preferably, this polymeric component is an epoxy resin.

In the present invention, the polymeric system not only contains the polymeric material and activator, but may optionally include additives to improve thermal stability, control set time, generate expansion, and control fluid loss. The additives may be incorporated into the system directly, or into one or both of the components.

Any suitable polymeric system may be utilized, with epoxy systems being preferred. In selecting a suitable polymeric system, it is desired that the system exhibit one or more, preferably several if not all, of the following characteristics: liquid system that is solid free, no shrinkage upon set up, maintains (or causes an increase in) the wellhole pressure; hydrophobic; density allows it to fall thru the well fluid at a suitable rate; and non-gas generating (so as not to cause micro channels).

As utilized in the present invention, the activator component serves not only to activate, set up, crosslink and/or cure the polymeric compound, but also to accelerate such, so as to reduce the wait on cement (WOC) time. The activator causes the sealant to set under downhole temperature and pressure conditions at an accelerated rate. Of course, this activator component will have to be carefully selected depending upon the material utilized as the first component.

In the present invention, accelerated set times are generally less than 12 hours, preferably less than 10 hours, more preferably less than 8 hours, even more preferably less than 6 hours, still more preferably less than 4 hours, and yet more preferably less than 2 hours.

The activator will cause the polymeric sealant to set under downhole conditions to cause the sealant to bond to the casing and or other formation surfaces in the annulus. The pipe may have coating of oil or water based drilling mud.

The activator component may be selected to not only accelerate cement set, but may optionally be selected to also alter slurry density, clean downhole surfaces, and/or improve bond.

The activator will be selected for its known property for accelerating the setup, activation, cure, crosslinking, of the polymeric material. For the preferred epoxy resin system, activators for epoxies are well known, and any suitable one may be utilized. In many instances paired resin-activator systems are commercially available.

Examples of commercially available materials follows and possible formulations follow. All materials are Benchmark. All are manufactured by Resolution Chemicals. Concetrations are parts by weight.

Materials: EPON 862 or 863-RESIN, EPICURE 3046 low-temp hardener, EPICURE W high temp hardener, Heloxy 7-primary reactive diluent, CARDURA E10P-secondary, high-temp diluent. Formulations: (1) 100 EPON 862 or 863+ 17 to 40 EPICURE 3046 good 50 F to 100 F; (2) 100 EPON 862 or 863-RESIN +20 to 50 parts Heloxy 7+20 to 40 parts EPICURE 3046 good 70 F to 125 F; (3) 100 EPON 862 or 863-RESIN +20 to 50 parts HELOXY 7+10 to 20 parts EPICURE 3046+10 to 20 parts EPICURE W good 125 to 175 F; (4) 100 parts Epon 862 or 863-RESIN +0 to 50 parts HELOXY 7+17 to 35 parts EPICURE W good from 175 to 250 F; (5) 100 parts EPON 862 o4 863-RESIN +30 to 50 parts HELOXY 7+15 to 25 parts EPICURE W +0 to 20 parts CARDURA E10P good from 250 to 350 F.

The present invention also contemplates the use of two or more activator systems, generally selected to operate at various temperatures to assist in controlling any set, activation, curing, or crosslinking. A blend of polymeric material may also be utilized.

The method of the present invention for primary cementing a well, includes any of the known primary cementing methods in which is utilized the two component primary cementing composition as the cementing material. While a generalized primary cementing method is described below, it should be understood that any suitable primary cementing method as is known in the art, including any described above in the background or described in any cited reference (all of which are herein incorporated by reference), may be utilized with the plugging composition of the present invention.

Generally in the practice of the method of the present invention, the resin component and the activator component are mixed at the surface and then placed in the annulus and allowed to form into a hard impermeable mass.

Preferably, in the practice of the present invention, epoxy system is e heavier than the well fluid to allow gravity flow thru the well fluid to the annulus.

Any suitable apparatus and method for the delivery of the components may be utilized. As non-limiting examples, suitable delivery systems may utilize a dump bailer, coiled tubing and jointed tubing. They require a base to stack up against such as a packer, petal basket or sand plug. While any suitable delivery mechanism can be utilized, more specific non-limiting examples of suitable delivery mechanisms include: dump bailer run on electric line or slick line; pumping through tubing, drillpipe, work strings or any tubulars; allowing fall through fluids via gravity; and pumping into an annulus or pipe without displacing (i.e., "bull heading").

In some instances epoxy system will not have suitable density, specifically, the density may not be greater than that of the well fluid.

The present invention provides for the utilization of weighting agent additives to the first component or the second component, or to the resultant combined system, to change the density of the mixed system. Suitable additives to change the density include metal salts, preferably calcium chloride. Other examples of weighting agents include sand, barite, hemitite, calcium carbonate, FeO, MgO, and manganese ore. Sufficient amounts of the additive are utilized to achieve the desired density.

In the primary cementing method of the present invention the first and second components are surface mixed. The mixed components are then introduced into the annulus to allow for in-situ formation of the hard impermeable mass to fill the annulus.

It should be appreciated that at some point, the density differential between the polymeric system and the well fluid is so low as to result in too slow of displacement.

On the other hand, it should further be appreciated that at some point, the density differential between the system and the well fluid is so great as to result in problems.

Thus, the density differential should be selected so as to provide suitable gravity feed of the system thru the well fluid to the desired location.

Typical densities for the well fluid will be in the range of about 8.33 ppg up to about 20.0 ppg, with typical densities for the activator in the range of about 8.33 ppg up to about 21.0 ppg, and with typical densities for the sealant system in the range of about 8.54 up to about 22.0 ppg.

It should be understood that other well fluid additives as are well known in the art may be incorporated into the first and/or second component, or added before, along with, or after the introduction of the first and/or second component, non-limiting examples of which include surfactants, surface bond enhancers (non-limiting examples include styrene butadiene latex, polyvinal alcohols, resins, other adhesives), emulsifiers, ph control agents, fluid loss additives, gas prevention additive, dispersants, expanding agents, and wetting agents.

Although the present invention has been illustrated by preferred reference to epoxy systems, it should be understood that any primary cementing composition having two or more components can be utilized in the present invention.

All cited patents are herein incorporated by reference.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A method of primary cementing a well comprising a well bore and a pipe residing in the well bore forming an aunulus between the pipe and welt bore, the method comprising:
   (A) providing a epoxy resin component and an activator component;
   (B) surface mixing the components to form an epoxy system, wherein the system has a density greater than the density of the well fluid, and wherein the system is solid free;
   (C) placing The system in the annulus; and,
   (D) allowing the epoxy system to gravity flow to a desired position in the annulus.

2. The method of claim 1, wherein step (C) is carried out utilizing one or more of a dump bailer; pumping through tubing, drillpipe, work strings or tubulars; gravity flow; and bull heading.

3. The method of claim 1, wherein the well fluid density is in the range of about 8.33 ppg up to about 20.0 ppg, the activator density is in the range of about 8.33 ppg up to about 21.0 ppg, and the resin density is in the range of about 8.54 up to about 22.0 ppg.

4. A method of primary cementing a well comprising a well bore and a pipe residing in the well bore forming an annulus between the pipe and well bore, the method comprising:
   (A) providing a epoxy resin component and an activator component;
   (B) surface mixing the components to form an epoxy system, wherein the system has a density greater than the density of the well fluid, and wherein the system is solid free;
   (C) placing the system in the annulus;
   (D) allowing the system to gravity flow to a desired position in the annulus; and,
   (E) allowing the system to form a hard impermeable mass.

5. The method of claim 4, wherein step (C) is carried out utilizing one or more of a dump bailer; pumping through tubing, drillpipe, work strings or tubulars; gravity flow; and bull heading.

6. The method of claim 4, wherein the well fluid density is in the range of about 8.33 ppg up to about 20.0 ppg, the activator density is in the range of about 8.33 ppg up to about 21.0 ppg, and the resin density is in the range of about 8.54 up to about 22.0 ppg.

* * * * *